(12) United States Patent  (10) Patent No.: US 9,073,458 B2
Kojima  (45) Date of Patent: Jul. 7, 2015

(54) VEHICLE SEAT APPARATUS

(71) Applicant: Yasuhiro Kojima, West Bloomfield, MI (US)

(72) Inventor: Yasuhiro Kojima, West Bloomfield, MI (US)

(73) Assignee: Aisin Seiki Company, Ltd., Kariya (JP)

( * ) Notice: Subject to any disclaimer, the term of this patent is extended or adjusted under 35 U.S.C. 154(b) by 61 days.

(21) Appl. No.: 13/667,495

(22) Filed: Nov. 2, 2012

(65) Prior Publication Data

US 2013/0113260 A1  May 9, 2013

Related U.S. Application Data

(60) Provisional application No. 61/555,837, filed on Nov. 4, 2011.

(51) Int. Cl.
*B60N 2/22* (2006.01)
*B60N 2/235* (2006.01)

(52) U.S. Cl.
CPC ................... *B60N 2/2358* (2013.01)

(58) Field of Classification Search
CPC ....... B60N 2/20; B60N 2/2354; B60N 2/2358
USPC .................... 297/363, 378.12, 374
See application file for complete search history.

(56) References Cited

U.S. PATENT DOCUMENTS

| | | | | |
|---|---|---|---|---|
| 3,079,199 | A * | 2/1963 | Tischler | 297/367 R |
| 3,523,593 | A * | 8/1970 | Karasick | 188/82.3 |
| 4,660,886 | A * | 4/1987 | Terada et al. | 297/367 R |
| 6,045,188 | A * | 4/2000 | Schooler | 297/362.14 |
| 7,255,398 | B2 | 8/2007 | Tokui et al. | |
| 7,922,250 | B2 * | 4/2011 | Rohee | 297/367 L |
| 8,033,607 | B2 * | 10/2011 | Kojima et al. | 297/367 P |
| 2008/0169695 | A1 * | 7/2008 | Hahn et al. | 297/367 |
| 2008/0231103 | A1 * | 9/2008 | Rohee | 297/354.1 |
| 2009/0243362 | A1 * | 10/2009 | Wieclawski | 297/366 |
| 2011/0115272 | A1 * | 5/2011 | Kojima et al. | 297/367 R |
| 2013/0113260 | A1 | 5/2013 | Kojima | |

* cited by examiner

*Primary Examiner* — Elizabeth A Plummer
(74) *Attorney, Agent, or Firm* — Oblon, McClelland, Maier & Neustadt, L.L.P.

(57) ABSTRACT

A locking mechanism of a seat for a vehicle, the seat including a seat back and a seat base, the locking mechanism including a recliner that reclines the seat back and locks the seat back in a position, the recliner and a memory ring being located on the axis, and when the memory ring is held relative to the recliner the seat back returns to an original position when the seat back travels in a forward direction from the original position past an upright position and then moves in a rearward direction back to the original position.

9 Claims, 8 Drawing Sheets

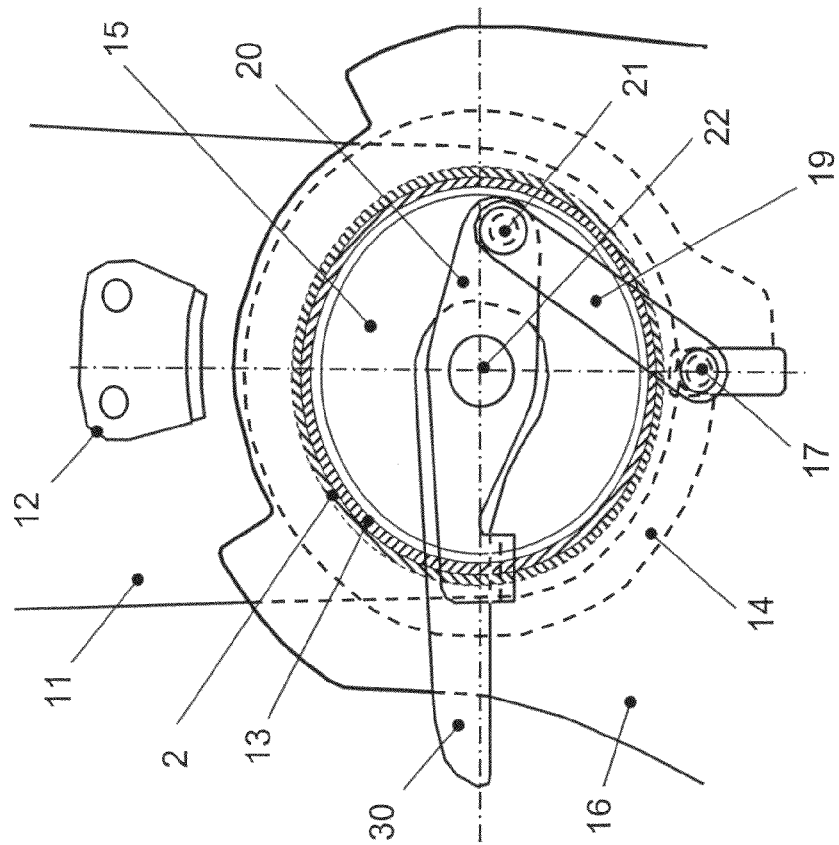
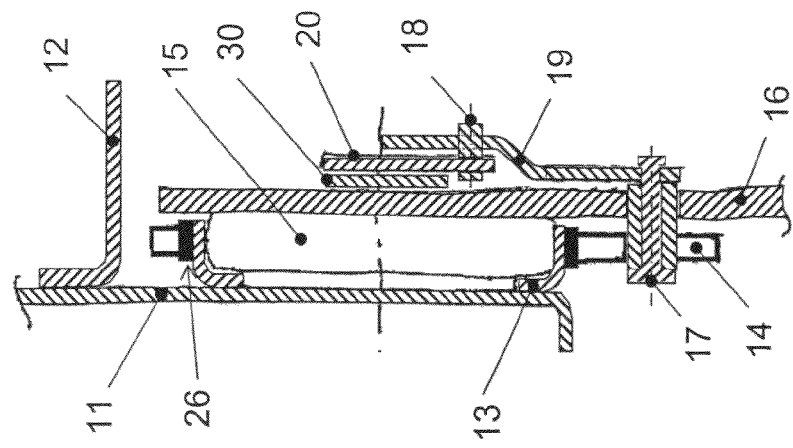
Fig. 3

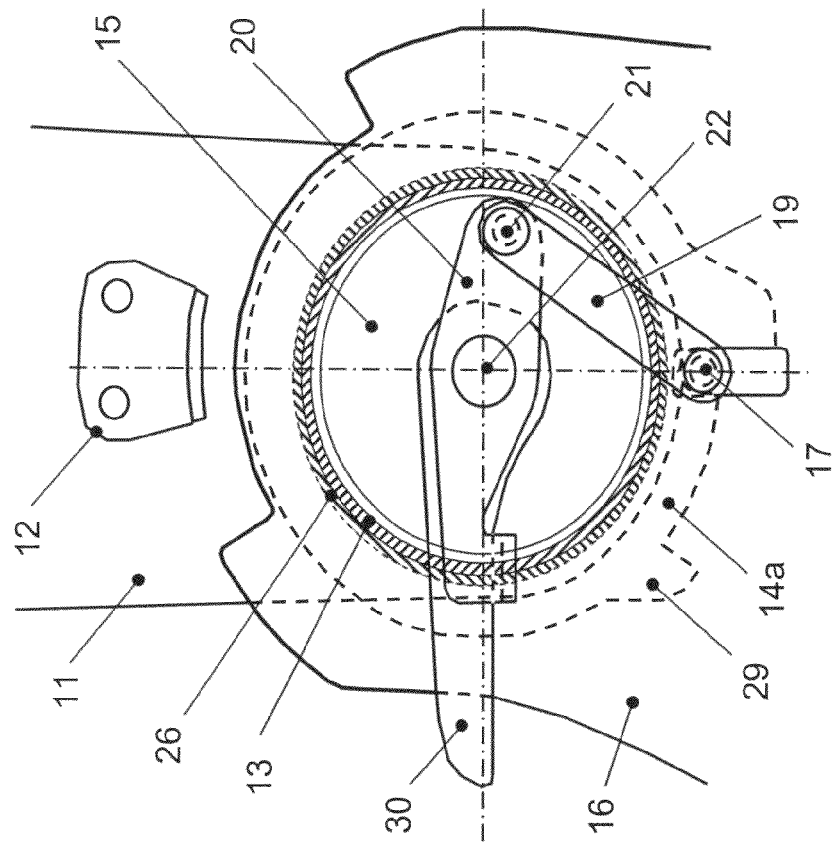
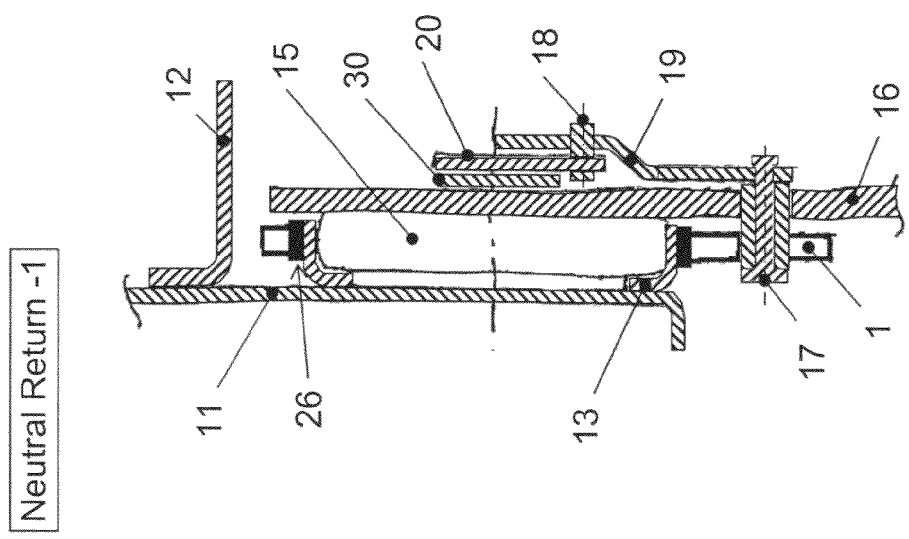
Fig. 4

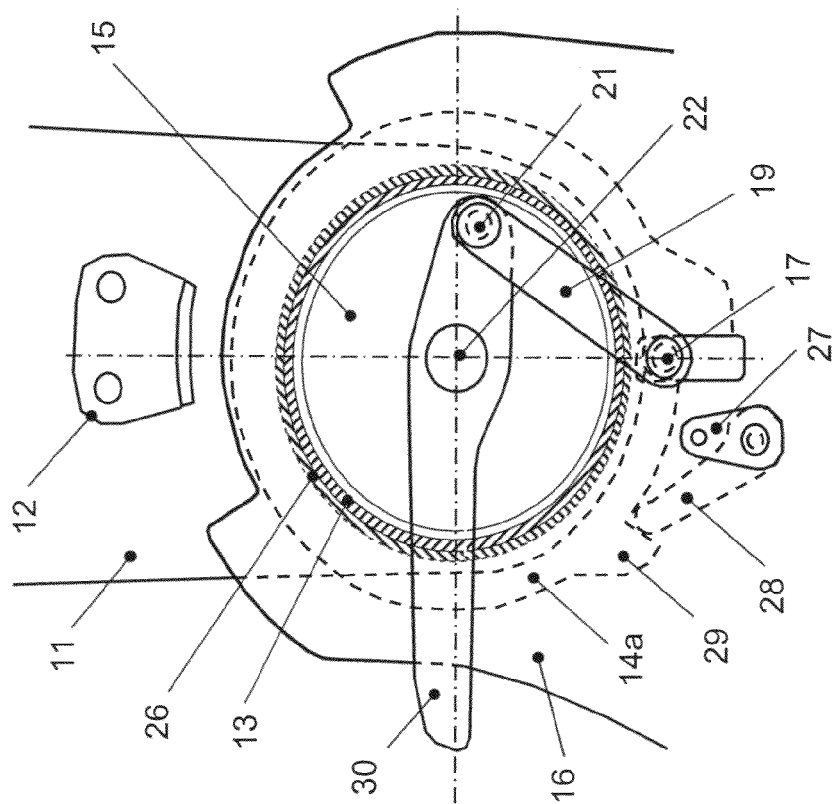
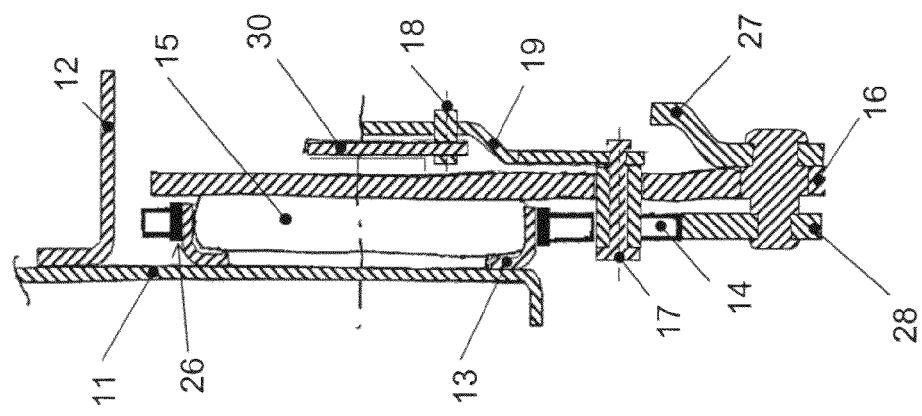
Fig. 5

VEHICLE SEAT APPARATUS

CROSS REFERENCE TO RELATED APPLICATIONS

This specification claims priority and contains subject matter related to U.S. Provisional Application No. 61/555,837 filed on Nov. 4, 2011, the entire contents of which are incorporated herein by reference

BACKGROUND OF THE INVENTION

1. Field of the Invention

Exemplary aspects of the present invention relate to the recliner function of a vehicle seat and in particular to the recliner return walk in mechanism.

2. Description of the Related Art

Seats of a vehicle such as an automobile may be provided with a reclining mechanism that allows the seat back to pivot at a base portion thereof. One type of reclining mechanism allows the seat back to pivot to a forward position to allow the ingress and egress of passengers behind the seat. This reclining mechanism has several defined positions including: a neutral position, an upright position, a rear most position, and a front most position; where the ingress/egress of passengers behind occurs at the front most position However, these reclining mechanisms have several inadequacies which make their use less than ideal. One such problem is that if the seat back is rearward of neutral, then the release leaver to allow the seat back to pivot must be held in a release position until the seat back passes the neutral position. If the operator were to release the lever prior to passing the neutral position, then the seat back would lock in place.

Furthermore, if the seat back is in between the upright position and the neutral position when the lever is actuated, the seat back recliner will not lock if the seat back is not returned to the neutral position. Moreover, the seat back will return to a position more rearward than the original position between the neutral position and the upright position.

SUMMARY OF THE INVENTION

In one aspect of the present disclosure, a locking mechanism of a seat for a vehicle is provided with a seat back; a seat base; a link mechanism; a walk-in lever connected to the link mechanism; a memory pin connected to an end of the link mechanism; a recliner that reclines the seat and locks the seat in a position; and a memory ring that contacts the memory pin, the memory ring including a slot provided radially inward from an outer surface of the memory ring. The locking mechanism being provided so that a position of the memory pin is locked relative to the memory ring when memory pin is within the slot of the memory ring and the position of the memory pin is moveable relative to the memory ring when the memory pin is removed from the slot of the memory ring via the walk-in lever.

In another aspect of the present disclosure, a locking mechanism of a seat is provided including a seat back; a seat base; a link mechanism; a walk-in lever connected to the link mechanism; a memory pin connected to an end of the link mechanism; a recliner that reclines the seat and locks the seat in a position; and a memory ring circumferentially provided around the recliner that contacts the memory pin, the memory ring including a slot provided radially inward from an outer surface of the memory ring. The locking mechanism arranged so that movement of the walk-in lever moves the memory pin out of the slot thereby allowing the memory ring and the recliner to rotate together which causes the seat back to move from an original position in a forward direction toward a forward most position, and the seat back locks back in the original position when the seat back travels in the forward direction past an upright position and then returns in a rearward direction due to the memory pin engaging the slot.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 illustrates two views of a first embodiment of a recliner mechanism in accordance with an exemplary aspect of the disclosure;

FIG. 4 illustrates two views of a second embodiment of a recliner mechanism in accordance with an exemplary aspect of the disclosure;

FIG. 5 illustrates two views of a third embodiment of a recliner mechanism in accordance with an exemplary aspect of the disclosure.

DETAILED DESCRIPTION OF THE PREFERRED EMBODIMENTS

Figure 1:
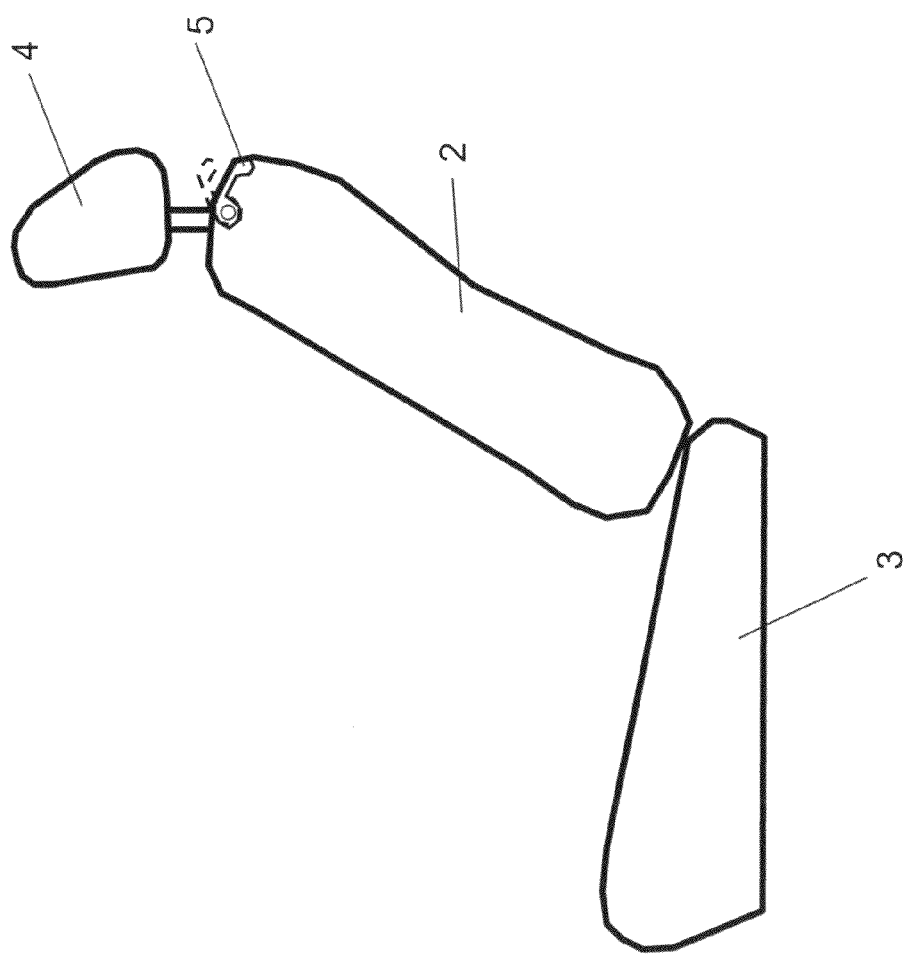
FIG. 1 illustrates a view of vehicle seat.

Referring now to the drawings, wherein like reference numerals designate identical or corresponding parts throughout the several views.

FIGS. 1-6 depict various aspects of a recliner mechanism for a vehicle seat. Here a vehicle refers to a land vehicle exemplified by an automobile. However, the present disclosure is also applicable to any similar type vehicle, such as but not limited to, a sport utility vehicle, a pickup truck, a commercial vehicle or the like.

FIG. 1 illustrates schematically a vehicle seat 1 in accordance with the present disclosure. The vehicle seat 1 includes a seat base 3, a seat back 2, a head rest 4, and a shoulder lever 5. The seat base 3 is provided a lower portion of the vehicle seat 1 taken in a vehicle height direction The seat base 3 is attached to the vehicle through lower supports (not illustrated). The seat base 3 being configured for an occupant to sit upon.

The seat back 2 is attached to the seat base 3 at a lower portion of the seat back 2. The seat back 2 is rotatable relative to the seat base 3 so that the seat back 2 pivots in forward and rearward directions. Seat back 2 typically moves in a fore-aft direction of the vehicle. The seat back 2 is configured for an occupant to rest their back against.

Attached at a top portion of the seat back 2 is a head rest 4. The head rest 4 protects the occupant from injury in the event of an accident.

The seat back 2 also includes the shoulder lever 5 at the top portion thereof. The shoulder lever 5 is operable between a closed state and a released state. The shoulder lever 5 will be described in greater detail later.

Figure 6A:
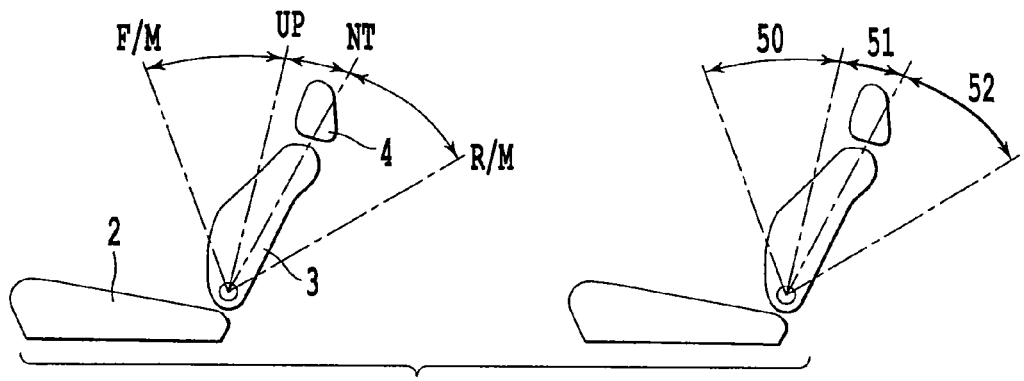
FIGS. 6A-6C illustrate several views of the advantageous use of the first through third embodiments.
Figure 6B:
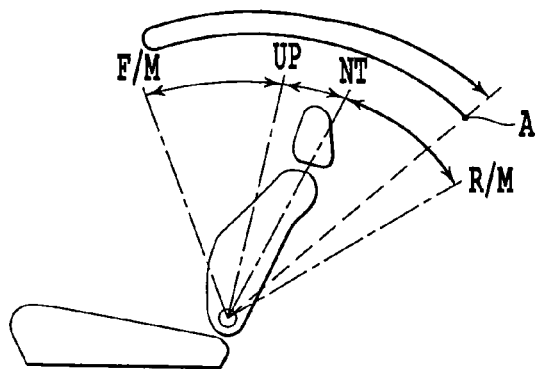
Figure 6C:
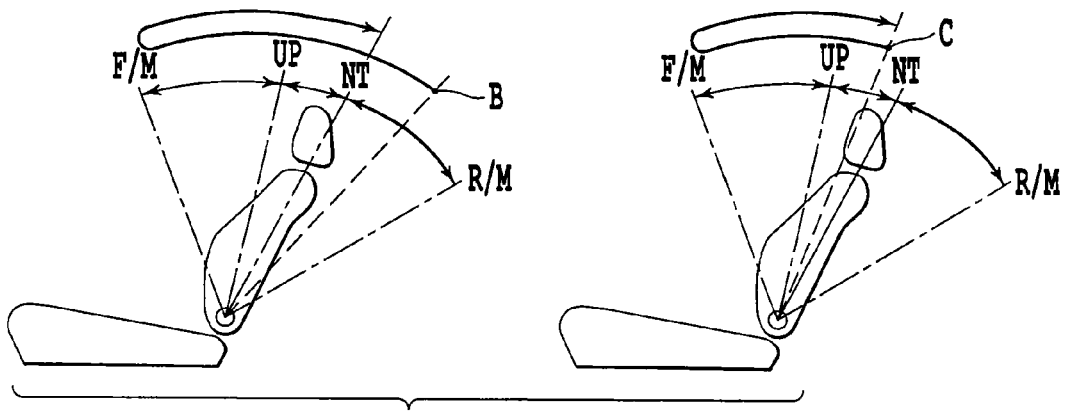

Discussed above, the seat back 2 pivots relative to the seat base 3 in a fore-aft direction. FIGS. 6A-6C illustrate an exemplary range of motion for the seat back 2. The seat back 2 is moveable between the front most position F/M and a rear most position R/M. Also illustrated in FIG. 6 is an upright position UP in which the seat back 2 is upright relative to the seat base 3. Further, the seat back 2 includes a neutral position NT provided between the upright position UP and the rear most position R/M.

As can be seen in FIG. 6A, the recliner mechanism of the seat back 2 has operational states defined by the positions F/M, NT, UP, and R/M. These zones will be described in greater details with regard to the specific embodiments.

First Embodiment

Figure 2:
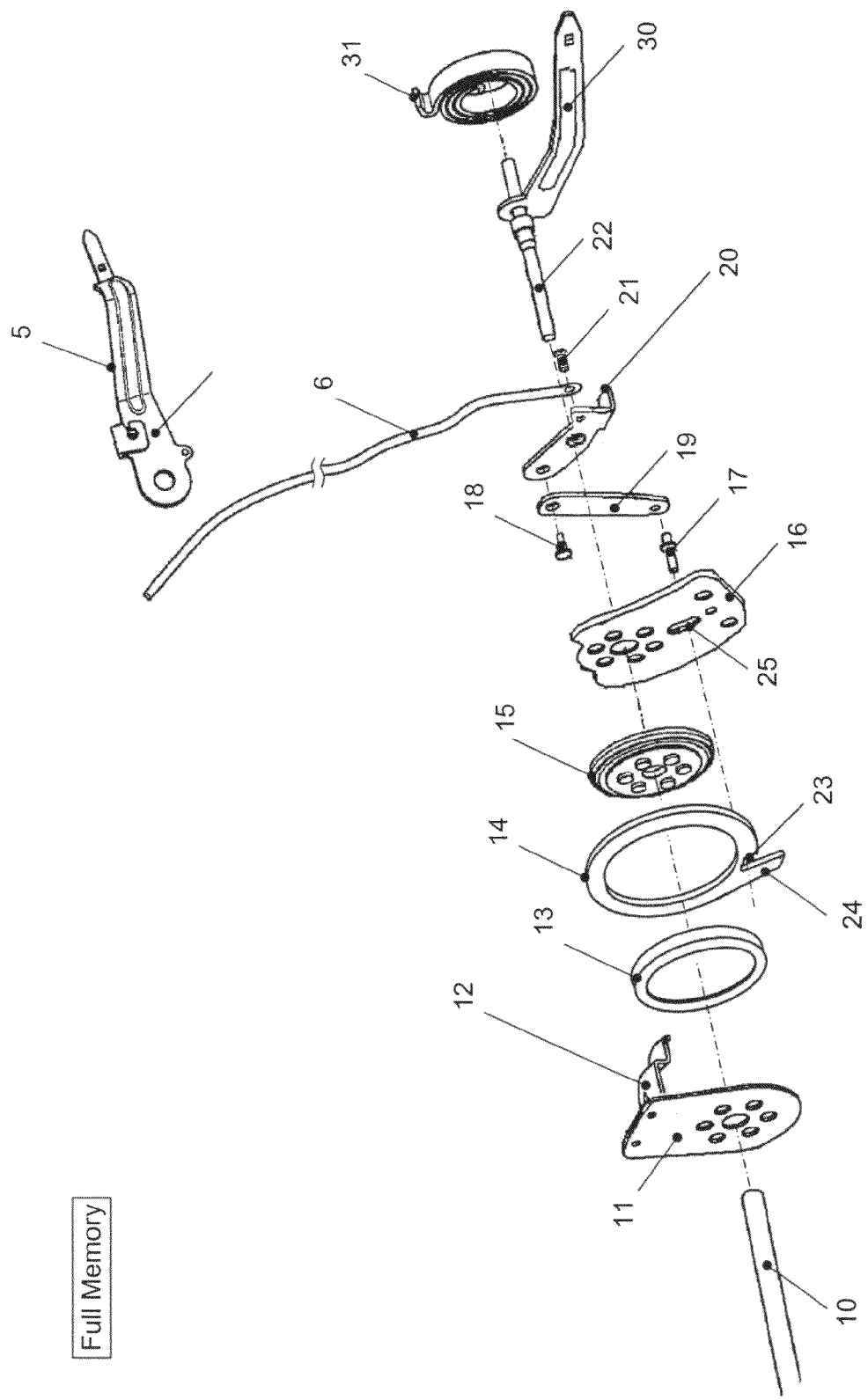
FIG. 2 illustrates an exploded view of a recliner mechanism in accordance with an exemplary aspect of the disclosure.

FIG. 2 is an exploded view of an exemplary recliner mechanism in accordance with the present disclosure. FIG. 3 are two additional representative views of the first embodiment. As can be seen in FIG. 2, a spring 31 is provided to the seat back 2 so that the spring 31 biases the seat back 2 toward the front most position F/M.

A recliner 15 is provided which locks the seat back 2 in a locked position between the upright position UP and the rear most position R/M. The recliner is provided between a recliner plate 16 and an upper arm 11. A center portion of the recliner 15 is supported by a connecting pipe 10 and the hinge pin 22 which is attached to the recliner release lever 30. When the recliner release lever 30 is rotated, it is possible to release the recliner 15 from a locked state.

The walk in release lever 20 includes a hole through which the hinge pin 22 passes. Accordingly, the walk in release lever 20 rotates about the hinge pin 22. However, the recliner lever 30 operates independent of the walk in release lever 20. That is, operation of the recliner release lever 30 by a user will cause the hinge pin 22 to rotate and the recliner 15 to unlock but will have no effect on the walk in release lever 20. Therefore, operation of the recliner lever 30 does not cause the walk in release lever 20 to rotate around the hinge pin 22.

However, the walk in release lever 20 is provided such that movement of the walk in release lever 20 does rotate the recliner release lever 30 via the hinge pin 22. This dual mode capability is due to the design of the hole through which the hinge pin 22 passes. The hole is designed such that movement of the walk in lever 20 causes the walk in lever 20 to engage with the hinge pin 22 to cause relative movement of recliner release lever 30; thereby releasing the recliner 15. However, the converse is not true. As discussed above, the hole of the walk in lever 20 is arranged so that movement of the recliner release lever 30 does not cause the hinge pin 22 to engage the walk in release lever 20.

The shoulder lever 5, which is provided to the top portion of the seat back 2, is attached to a walk in release lever 20 by a cable 6. A pin 21 attaches the cable 6 to the walk in release lever 20. The walk in release lever 20 is rotatably attached to a memory lever 19 via a release pin 18. The memory lever 19 includes a memory pin 17 at a end distal from the release pin 18.

The recliner 15 is located on an axis with a ring holder 13. Shown in FIG. 3, the recliner 15 is circumferentially surrounded by the ring holder 13. The ring holder 13 being connected to the upper arm 11 or the recliner 15 at a side of the recliner 15 that faces the upper arm 11 and can be rotated with seat back 2.

The ring holder 13 is circumferentially surrounded by a memory ring 14. The memory ring 14 is press fit onto the ring holder 13. Further, the memory ring 14 is composed of a friction material. For example, the memory ring 14 could be made of a type of plastic. However, the memory ring could also be made of a more durable material such as metal. The memory ring 14 could also be provided with an optional friction ring 26 provided on an inner circumferential surface of the memory ring 14, between the memory ring 14 and the recliner 15.

The memory ring 14 has a substantially constant thickness in the radial direction. The memory ring 14 including a slot 23 that extends in a radial direction below the surface of the memory ring that is defined by the substantially constant thickness. The slot 23 is also being partially formed by a first memory ring protrusion 24, that extends radially beyond the surface that is defined by the substantially constant thickness.

The memory pin 17 provided to the memory lever 19 extends through a slot 23 provided to the recliner plate 16. A hole fit system is provided between the slot 23 and the pin 17. Therefore the slot 23 does not affect the operation of the memory pin 17, when the memory pin 17 is moved by the memory lever. The memory pin 17 is an example of a first locating device, and the slot 23 is an example of a second locating device. The first and second locating devices not being limited to a pin and a slot.

The memory pin 17 is slidably provided to the slot 23 of the memory ring. Specifically, the memory pin is arranged to move in a direction substantially parallel to a direction of the slot 23 when the memory pin 17 is initially moved by the memory lever 19. Once the memory pin 17 is free of the slot 23, the memory pin 17 is capable of sliding along the memory ring 14 on the outer surface of the memory ring 14.

As illustrated in FIG. 7, an operation of the shoulder lever 5 will now be described. When the shoulder lever 5 is in the closed or rest position then the walk in release lever 20 is not affected by the cable 6 and the walk in release lever 20 is in a locked position. That is, the walk in release lever 20 is positioned so that the memory lever 19, which is attached to the walk in release lever 20 via the release pin 18, is arranged so that the attached memory pin 17 is within the slot 23 of the memory ring 14 at bottom portion thereof. The memory pin 17 is within the slot 23 due to a biasing force of a spring (not shown) in a direction opposite of a force exerted by the cable. This position of the memory lever 19 and memory pin 17 will be referred to as the locked position.

Operation of the shoulder lever 5 from the closed position toward the release position causes the cable 6 to exert a force on the walk in release lever 20. In particular, the walk in release lever 20 is made to rotate about the hinge pin 22. The rotation of the release lever 20 about the hinge pin 22, causes the memory lever 19 to move the memory pin 17.

As seen in FIG. 7, the movement of the memory lever 19 causes the memory pin 17 to move down within the slot 23 of the memory ring 14. The memory pin 17 moves in a direction parallel to the slot 23, in a substantially radial direction of the recliner 15.

Once the memory pin 17 moves completely out of the slot 23, the biasing force of the spring 31 will cause the seat back 2 to pivot in the forward direction. Since the memory pin 17 is removed from the slot 23, the memory ring 14 rotates along with the upper arm 11. Further, the recliner 15 includes at least two portions that rotate relative to each other. A first portion faces the upper arm 11 and a second portion faces the recliner plate 16. The first portion of recliner 15 being rotatable against the recliner plate 16 and rotatable with the seat back 2 via upper arm 11. Accordingly, the memory ring 14 rotates with the upper arm 11 via ring holder 13 by the first portion of the recliner 15.

After an initial rotation of the memory ring 14, the memory pin 17, which is now freed from the slot 23, runs around the outer circumferential surface of the memory ring 14. Here, the recliner 15 is unlocked and the memory ring rotates with the upper arm 11 so that the seat back 2 may be moved fore and aft. After the initial rotation, even if the shoulder lever 5 is released by the user, the recliner 15 will remain unlocked due to the memory pin 17 being out of the slot 23 and running (sliding) along the outer circumferential surface of the memory ring 14. Discussed above, the recliner 15 includes at least two portions that rotate relative to each other. A first portion faces the upper arm 11 and a second portion faces the recliner plate 16. This first portion of recliner 15 being rotatable against the recliner plate 16 and rotatable with the seat back 2, and the memory ring 14 rotates with the upper arm 11 via ring holder 13 by the first portion of the recliner 15.

Discussed above, when the memory pin 17 is removed from the slot 23 then the recliner memory ring 14 and upper arm 11 rotate together. However, when the memory pin 17 is located in the slot, then the memory ring 14 and upper arm 11 do not rotate. This second instance exists when the recliner release lever 30 is operated by the user but the shoulder lever 5 is not operated. As discussed above, under this operation the walk in release lever 20, the memory lever 19, and the memory pin 17 are not moved by the movement of the recliner release lever 30.

This selective rotation of the memory ring 14 relative to the recliner 15 is due to a frictional slide resistance between the memory ring 14 and the recliner 15. This resistance is configured such that when the memory pin 17 is in the locked position that the memory ring 14 slips relative to the recliner 15. However, when the memory pin 17 is released from the slot 23 then the frictional resistance between the recliner 14 and the memory ring 15 is great enough to cause these members to co-rotate.

The various operation states of the first embodiment will now be explained in view of FIGS. 6A and 6B. Discussed above, the seat back 2 is operable between the front most position F/M and the rear most position R/M. In between these positions are the upright position UP and the neutral position NT. The above described embodiment will now be referred to as full position memory walk in recliner mechanism.

As shown in FIG. 6B, the full position member walk in recliner has the advantage of returning to the original position after the walk in procedure has been completed. In particular, if the original position prior to operating the shoulder lever 5 is between the upright position UP and the rear most position R/M, then the seat will return to that same original position after the walk in procedure has concluded.

By way of example, FIG. 6B illustrates an original position "A" located between the neutral position NT and the rear most position R/M. As discussed above, the original position can be any position between the upright position UP and the rear most position R/M, and need not be located in the "A" position.

Figure 7A:
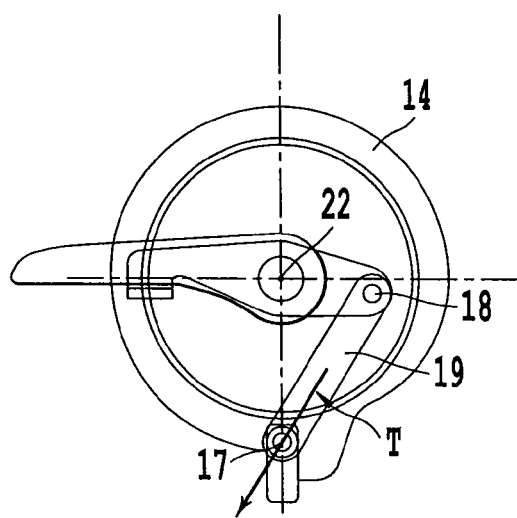
FIGS. 7A-7D illustrate several views of the operation of the first embodiment.
Figure 7B:
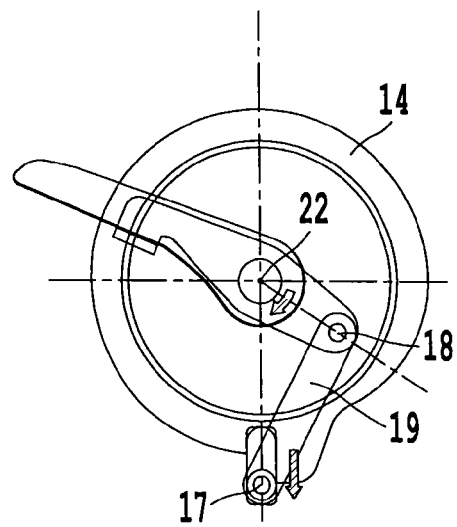
Figure 7C:
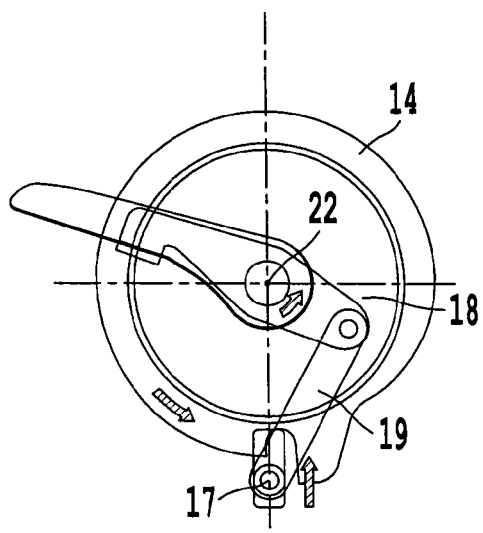

A user then operates the shoulder lever 5 and initiates the walk in procedure discussed above and illustrated in FIG. 7A. Specifically, the shoulder lever via the cable 6; walk in release lever 20; release pin 18; and memory lever 19 moves the memory pin 7 out of the slot 23. The spring 31 biases the recliner 15 so that the memory pin 17 begins to run along the outer surface of the memory ring 14 as shown in FIG. 7B. At this point the shoulder lever 5 can be released and the recliner 15 will remain unlocked as shown in FIG. 7C.

Figure 7D:
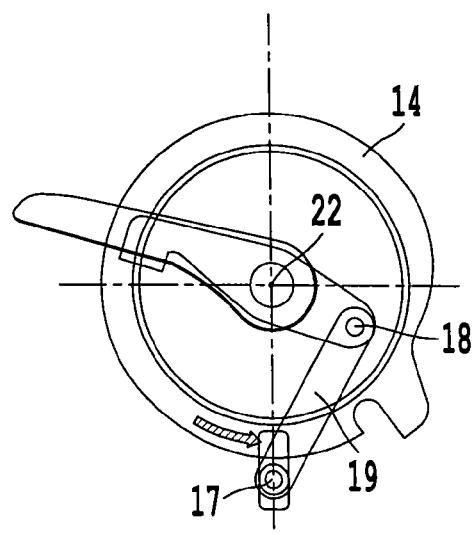

The operator then moves the seat back 2 forward beyond the upright position UP so that the user may ingress or egress behind the vehicle seat 1. While the seat back 2 rotates forward the recliner 15 and memory ring 14 rotate together with the memory pin 17 moving along the outer circumferential surface of the memory ring 14 as shown in FIG. 7D.

The seat back 2 comes to stop at the front most position F/M. When desired, the user then moves the seat back 2 toward the rear most position R/M against the bias force of the spring 31. Essentially, the recliner 15 and the memory ring 14 retrace the movement made previously in the forward direction; the memory pin 17 moving along the outer surface of the memory ring 14.

When the seat back 2, moving rearwards, arrives at the position "A" the memory pin 17 engages with the slot 23. Accordingly, as shown in FIGS. 7A-7D, the full position memory walk in process is complete and the seat back 2 has returned to the original position "A."

Described above, the full position memory walk in process of the first embodiment has several advantages. The first of which is that a user need not hold the shoulder lever 5 in a release state through the walk in process. As discussed above, the memory pin 17 will ride along the outer surface of the memory ring 14 once the recliner 15 and the memory 14 (rotating together) have rotated a minimal amount.

Further, the full position memory walk in apparatus described above, returns to the original position after completion, so long as the original position was between the upright position UP and the rear most position R/M. Returning to the original position may be preferred as the user who later sits in the vehicle seat 1 does not have to further adjust the seat back 2 via the recliner release lever 30. Furthermore, the rear passenger and the front passenger will have a more accurate expectation to where the seat back 2 will lock into position after the walk in process.

Second Embodiment

A second embodiment will be described in view of FIG. 4. The second embodiment is structurally similar to that of the first embodiment and like components will not be again described. The primary difference between the first and second embodiments is that the memory ring 14a includes a second memory ring protrusion 29 that extends from the outer circumferential surface of the memory ring 14a. As shown in FIG. 4, the second memory ring protrusion 29 is provided a distance in the circumferential direction from the slot 23 and the first memory ring protrusion 24.

The second memory ring protrusion 29 contacts the memory pin 17 with the memory pin 17 is running along the outer circumferential surface of the memory ring 14a. When the memory pin 17 contacts the second memory ring protrusion 29, the operation of the memory ring 14 is stopped thereby stopping the movement of the memory pin 17. Additionally, the rotation of the memory ring 14a together with the recliner 15 is stopped. That is, the recliner 15 is allowed to continue rotating but the memory ring 14a is prevented from rotating with the recliner 15 due to the contact of the second memory ring protrusion 29 and the memory pin 17. The apparatus may also be designed so that the contact of the memory pin 17 with the second memory ring protrusion coincides with the seat back 2 reaching the front most position F/M.

The various operation states of the second embodiment will now be explained in view of FIG. 6C. Discussed above, the seat back 2 is operable between the front most position F/M and the rear most position R/M. In between these positions are the upright position UP and the neutral position NT.

The second embodiment will now be referred to as a neutral return walk in recliner mechanism.

By way of example, FIG. 6C illustrates an original position "B" is located between the neutral position NT and the rear most position R/M. As discussed above, the original position can be any position between the upright position UP and the rear most position R/M, and need not be located in the "B" position.

Figure 8A:
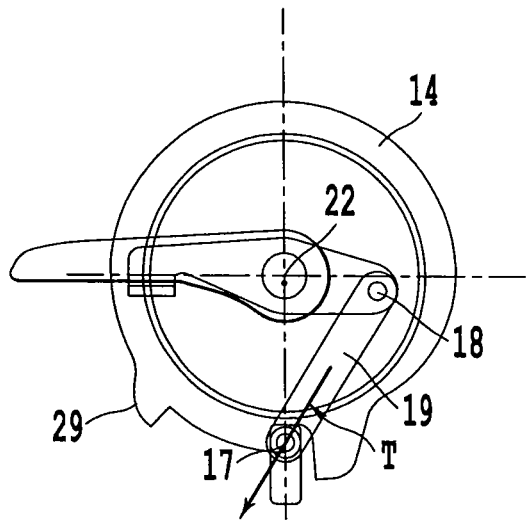
FIGS. 8A-8D illustrate several views of the operation of the second embodiment.
Figure 8B:
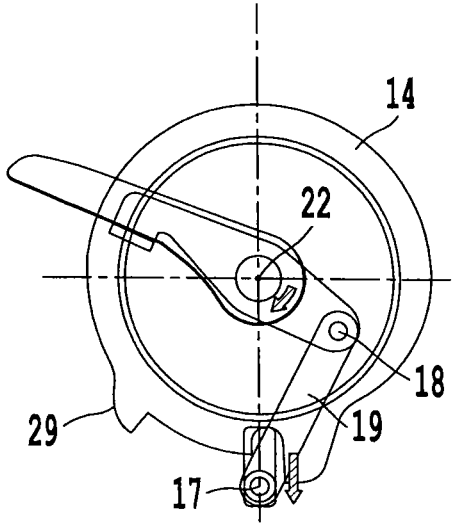
Figure 8C:
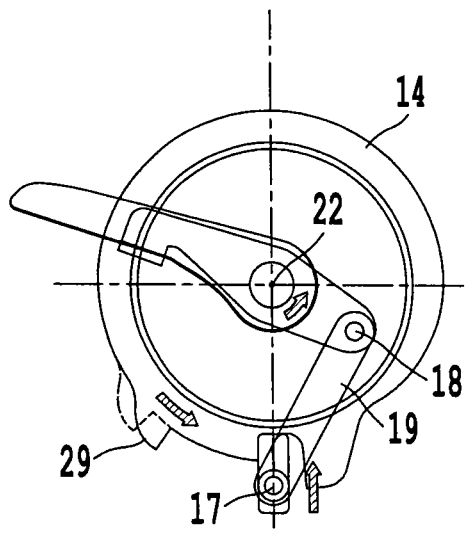

A user then operates the shoulder lever 5 and initiates the walk in procedure discussed above and illustrated in FIG. 8A-8D. Specifically, the shoulder lever via the cable 6; walk in release lever 20; release pin 18; and memory lever 19 moves the memory pin 7 out of the slot 23, as shown in FIGS. 8A and 8B. The spring 31 biases the recliner 15 so that the memory pin 17 begins to run along the outer surface of the memory ring 14a, as shown in FIG. 8C. At this point the shoulder lever 5 can be released and the recliner 15 will remain unlocked.

Figure 8D:
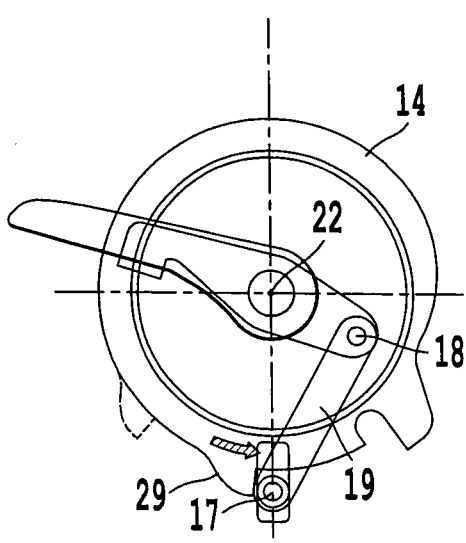

The operator then moves the seat back 2 forward beyond the upright position UP so that the user may ingress or egress behind the vehicle seat 1. While the seat back 2 rotates forward the recliner 15 and memory ring 14a rotate together with the memory pin 17 moving along the outer circumferential surface of the memory ring 14a, as shown in FIG. 8D. The recliner 15 and the memory ring 14a continue to rotate together until the memory pin 17 contacts the second memory ring protrusion 29. After this contact is made, the memory ring 14a is held by the memory pin 17.

The seat back 2 comes to stop at the front most position F/M. When desired, the user then moves the seat back 2 toward the rear most position R/M against the bias force of the spring 31. The recliner 15 rotates in the opposite direction and the memory ring 14 retrace the movement made previously in the forward direction; the memory pin 17 moving along the outer surface of the memory ring 14a. That is, in the reverse direction, the second memory ring protrusion 29 no longer holds the memory pin 17, which is now allowed to move along the outer surface of the memory ring 14a.

When the seat back 2 arrives at the neutral position NT the memory pin 17 enters the slot 23. Therefore the seat back 2 locks at the neutral position NT, and the neutral return walk in operation is complete.

When compared to the full position memory walk in operation of the first embodiment it can be seen in FIG. 6C that the neutral return walk in operation of the second embodiment does not return the seat back 2 to the original position "B" (in this example). Instead, the seat back 2 is returned to the neutral position NT.

A second example of the neutral return walk in operation of the second embodiment is provided in FIG. 6C. In this example the original position "C" is between the upright position UP and the neutral position.

Operation of this second example is similar to the operation of the first neutral walk in example, except that the seat back 2 arrives at the front most position F/M before the memory pin 17 contacts the second memory ring protrusion 29. Accordingly, the combined rotation of the recliner 15 and the memory ring 14 do not rotate far enough so that memory pin 17 contacts the second memory ring protrusion 29.

When the user operates moves the seat back 2 rear ward, the seat back 2 will move until it reaches the original position "C." At this point, the memory pin 17 enters the slot 23, and the seat back 2 is locked back at the original position "C." The neutral return walk in operation is then complete.

Accordingly, the neutral walk in operation of the second embodiment has the following operation as shown in FIG. 6C. If the original position is between the neutral position and the rear most position R/M, then the seat back 2 will lock at the neutral position at the completion of the walk in operation. However, if the original position is the between the upright position UP and the neutral position NT, then the seat back 2 will lock back at the original position at the completion of the walk in operation. This differs from the operation of the full position memory walk in operation which returns to the original position, even if the original position is between the neutral position NT and the rear most position R/M.

Third Embodiment

A third embodiment will be described in view of FIG. 5. The third embodiment is structurally similar to that of the second embodiment and like components will not be again described. The primary difference between the second and third embodiments is the inclusion of a stopper link 27 and a stopper lever 28.

The stopper link 27 is pivotally connected to the stopper lever 28. The stopper link engages with the second memory ring protrusion 29. In particular, the stopper lever 28 is normally biased against the outer surface of the memory ring 14a so that a distal end of the stopper lever engages with both the outer surface of the memory ring 14a and the second memory ring protrusion 29.

The cable 6 is connected to either the stopper link 27 or the stopper lever 28 in addition to being connected to the walk in release lever 19. The cable connections being configured so that a movement of the shoulder lever 5 creates a first action that moves the stopper lever 28 away from the outer surface of the memory ring 14a. The movement of the cable 6 creating a second action that moves the memory pin 17 via the memory lever 19, release pin 18, and memory lever 20.

Operation of the third embodiment will now be described. The third embodiment operates substantially like the second embodiment described above. In particular, the third embodiment is also a neutral walk in operation, so that: if the original position is between the neutral position and the rear most position R/M, then the seat back 2 will lock at the neutral position at the completion of the walk in operation; and if the original position is between the upright position UP and the neutral position NT, then the seat back 2 will lock back at the original position at the completion of the walk in operation.

The third embodiment differs in that the memory ring 14a is additionally prevented from rotation with the recliner 15 by the stopper lever 28. When the user operates the shoulder lever 5 the cable 6 causes the stopper lever 28 to disengage from the second memory ring protrusion 29, and the cable causes the memory pin 17 to disengage from the slot 23. After both of these actions, the memory ring 14a may rotate together with the recliner 15.

Once the memory ring 14a and the recliner 15 have rotated a small amount due to the bias force of the spring 31, the shoulder lever 5 may be released and the memory pin 17 will run along the outer surface of the memory ring 14a. Additionally, the stopper lever 28 will have rotated past a leading edge of the second memory ring protrusion 29 and the stopper lever will run along a back of the second memory ring protrusion 29 and eventually run along the outer surface of the memory ring 14a.

The operation of the third embodiment then continues the same as that of the second embodiment. When the seat back 2 is returned from the forward most position F/M, the memory pin 17 will engage with the slot 23 and the stopper lever 28 will engage with the second memory ring protrusion 29.

Described in detail above the first through third embodiments have several advantages over what is conventionally known. For example, according to the first and second embodiments the shoulder lever 5 may be released after an initial movement of the seat back 2 and the recliner 15 will be held in an unlocked state due to the interaction between the walk in release lever 20, the recliner lever 30, the hinge pin 22, and the recliner 15 when the release pin 17 is held outside of the slot 23 and runs along the outer surface of the memory ring 14 (14a). Moreover, the above features are made possible by the relatively simple structure of the embodiments described above. This allows for low cost and light weight.

Further, for example, in the second and third embodiments a full memory walk-in is possible. Accordingly, even if the seat back 2 comes forward and the memory pin 17 is at the front most (F/M) position the seat back 2 can return to the original position if a protrusion 29 (when provided) is located a position far enough. Thus, the seat back returns to the original position and not limited to the neutral position.

Obviously, numerous modifications and variations of the present invention are possible in light of the above teachings. It is therefore to be understood that within the scope of the appended claims, the invention may be practiced otherwise than as specifically described herein.

The invention claimed is:

1. A locking mechanism of a seat for a vehicle, the seat including a seat back and a seat base, the locking mechanism comprising:
   a recliner that reclines the seat back and locks the seat back in a position, the recliner located on an axis;
   a first locating device;
   a memory ring circumferentially surrounding the recliner, the memory ring including a second locating device configured to contact the first locating device, wherein
   a frictional resistance is between an inner circumferential surface of the memory ring and the recliner,
   when the second locating device contacts with the first locating device, the memory ring rotates relative to the recliner, and when the second locating device is removed from the first locating device, the memory ring is rotatable with the recliner due to the frictional resistance, and
   when the memory ring is held relative to the recliner, the seat back returns to an original position when the seat back travels in a forward direction from the original position and then moves in a rearward direction back to the original position.

2. The locking mechanism according to claim 1, wherein the first locating device is a memory pin, and the second locating device is a slot.

3. The locking mechanism according to claim 2, wherein the slot is provided radially inward from an outer surface of the memory ring.

4. The locking mechanism according to claim 2, wherein a position of the memory pin is locked relative to the memory ring when the memory pin is within the slot of the memory ring and the position of the memory pin is moveable relative to the memory ring when the memory pin is removed from the slot of the memory ring.

5. The locking mechanism according to claim 2, wherein
   the memory ring includes a protrusion that extends from the outer surface of the memory ring so the memory pin is movable along the outer surface of the memory ring as the seat back is moved in the forward direction, and
   the protrusion prevents the memory pin from farther movement along the outer circumference of the memory ring when the seat back is at a front-most position.

6. The locking mechanism according to claim 5, further comprising:
   a stopper lever connected biased towards an outer circumference of the memory ring by a spring, wherein
   the stopper lever abuts the protrusion when the memory pin is within the slot and the stopper lever is moved away from the protrusion when the walk-in lever moves the memory pin from within the slot.

7. The locking mechanism according to claim 2, wherein
   the memory ring includes a protrusion, that extends from the outer surface of the memory ring so the memory pin is movable along the outer surface of the memory ring as the seat back is moved in the forward direction, and
   when the memory pin contacts the protrusion, the seat back returns to a neutral position when the seat back is moved in the rearward direction after the memory pins contacts the protrusion.

8. The locking mechanism according to claim 1, wherein the memory ring is composed of a frictional material.

9. A locking mechanism of a seat for a vehicle, the seat including a seat back and a seat base, the locking mechanism comprising:
   a recliner that reclines the seat back and locks the seat back in a position, the recliner located on an axis;
   a memory ring circumferentially surrounding the recliner, the memory ring including a slot; and
   a memory pin, wherein
   a frictional resistance is between an inner circumferential surface of the memory ring and the recliner,
   the memory ring is rotatable with the recliner due to the frictional resistance when the memory pin is removed from the slot of the memory ring, the memory pin traveling along an outer surface of the memory ring, and
   when the memory pin travels a predetermined distance along the outer surface of the memory ring due to the seat back traveling in a forward direction, the seat back returns to a neutral position when the seat back is moved in a rearward direction after the memory pin travels the predetermined distance.

* * * * *